US011889464B2

(12) United States Patent
Nam et al.

(10) Patent No.: US 11,889,464 B2
(45) Date of Patent: Jan. 30, 2024

(54) RELIABLE PAGING AND SHORT MESSAGE TRANSMISSION WITH REPETITION

(71) Applicant: QUALCOMM Incorporated, San Diego, CA (US)

(72) Inventors: Wooseok Nam, San Diego, CA (US); Tao Luo, San Diego, CA (US); Wanshi Chen, San Diego, CA (US); Peter Gaal, San Diego, CA (US); Mahmoud Taherzadeh Boroujeni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 17/379,685

(22) Filed: Jul. 19, 2021

(65) Prior Publication Data
US 2022/0030546 A1 Jan. 27, 2022

Related U.S. Application Data

(60) Provisional application No. 63/054,512, filed on Jul. 21, 2020.

(51) Int. Cl.
H04W 68/00 (2009.01)
H04W 24/08 (2009.01)
(Continued)

(52) U.S. Cl.
CPC ......... H04W 68/005 (2013.01); H04W 24/08 (2013.01); H04W 56/001 (2013.01); H04W 72/0446 (2013.01); H04W 72/23 (2023.01)

(58) Field of Classification Search
CPC . H04W 68/005; H04W 24/08; H04W 56/001; H04W 72/0446; H04W 72/23; H04W 48/16
See application file for complete search history.

(56) References Cited

U.S. PATENT DOCUMENTS

2013/0336252 A1* 12/2013 Hsieh ............... H04W 72/23
370/329
2015/0043476 A1* 2/2015 Takeda ............ H04L 5/0051
370/329
(Continued)

FOREIGN PATENT DOCUMENTS

EP 3840494 A1 6/2021
WO 2018112846 A1 6/2018
(Continued)

OTHER PUBLICATIONS

International Search Report and Written Opinion—PCT/US2021/042354—ISA/EPO—dated Jan. 7, 2022.
(Continued)

Primary Examiner — Christine Ng
(74) Attorney, Agent, or Firm — Shumaker & Sieffert, P.A.

(57) ABSTRACT

A user equipment (UE) and base station may be configured to implement interleaving enhancement during an aggregated monitoring occasion. In some aspects, the UE may receive paging occasion configuration indicating repetition of a first paging physical downlink control channel (PDCCH) monitoring occasion by identifying a second paging PDCCH monitoring occasion. Further, the UE may decode, based on the paging occasion configuration, signals received on at least one of resources for the first paging PDCCH monitoring occasion or resources for the second paging PDCCH monitoring occasion.

30 Claims, 9 Drawing Sheets

(51) Int. Cl.
*H04W 56/00*        (2009.01)
*H04W 72/0446*      (2023.01)
*H04W 72/23*        (2023.01)

(56) References Cited

U.S. PATENT DOCUMENTS

| | | | | |
|---|---|---|---|---|
| 2018/0184434 | A1* | 6/2018 | Blankenship | H04W 72/23 |
| 2019/0150183 | A1* | 5/2019 | Aiba | H04W 24/10 |
| | | | | 370/336 |
| 2019/0313386 | A1* | 10/2019 | Hwang | H04W 52/0229 |
| 2020/0022144 | A1* | 1/2020 | Papasakellariou | H04W 72/23 |
| 2020/0045706 | A1* | 2/2020 | Shin | H04W 72/23 |
| 2020/0084747 | A1* | 3/2020 | Hong | H04W 72/23 |
| 2020/0280971 | A1* | 9/2020 | Moon | H04L 5/0053 |
| 2020/0322918 | A1* | 10/2020 | Shih | H04W 24/08 |
| 2021/0314866 | A1* | 10/2021 | Lee | H04W 76/28 |
| 2021/0329546 | A1* | 10/2021 | Wang | H04W 76/15 |
| 2021/0385785 | A1* | 12/2021 | Lee | H04W 72/23 |
| 2022/0053468 | A1* | 2/2022 | Chen | H04W 72/23 |
| 2022/0201515 | A1* | 6/2022 | Chatterjee | H04L 1/0038 |
| 2022/0263618 | A1* | 8/2022 | Harada | H04W 56/0015 |
| 2022/0394526 | A1* | 12/2022 | Wang | H04W 24/08 |

FOREIGN PATENT DOCUMENTS

| | | |
|---|---|---|
| WO | 2019192006 A1 | 10/2019 |
| WO | 2020036442 A1 | 2/2020 |

OTHER PUBLICATIONS

Partial International Search Report—PCT/US2021/042354—ISA/EPO—dated Nov. 4, 2021.

* cited by examiner

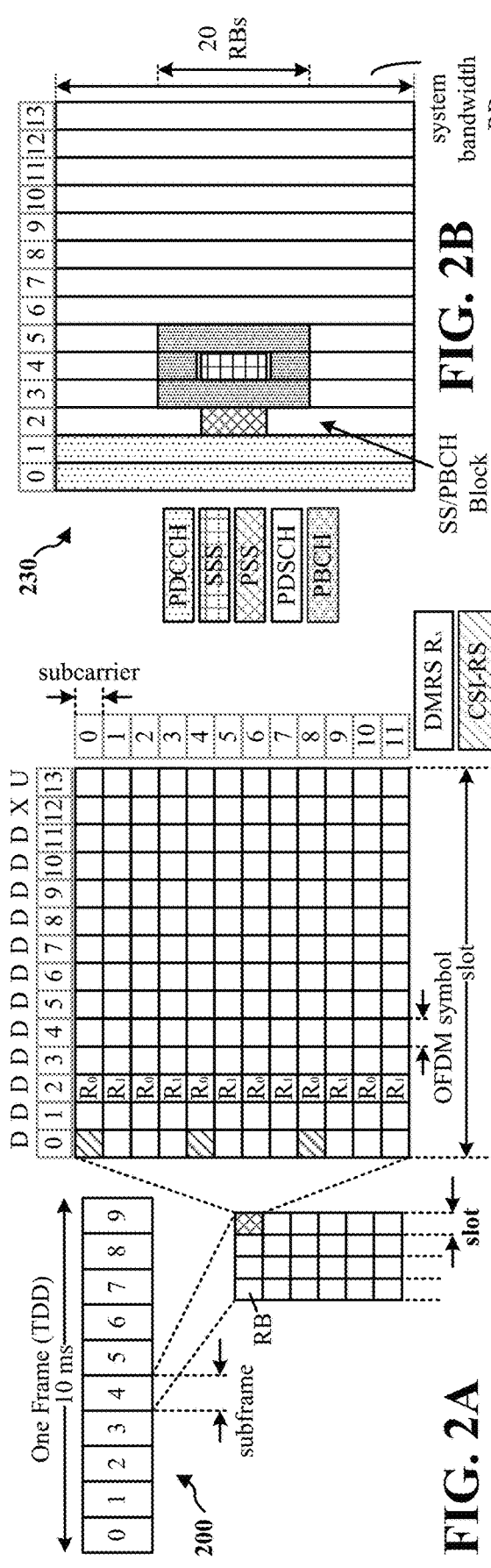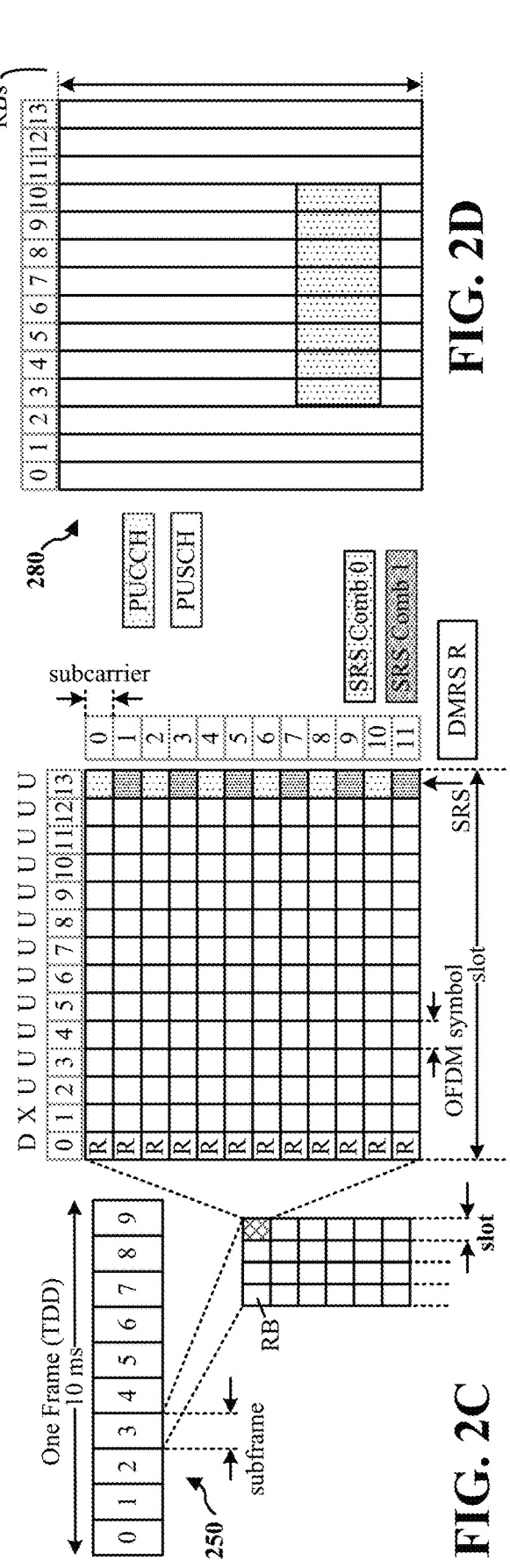

RELIABLE PAGING AND SHORT MESSAGE TRANSMISSION WITH REPETITION

CROSS-REFERENCE TO RELATED APPLICATION

This application claims priority to U.S. Application No. 63/054,512, entitled "RELIABLE PAGING AND SHORT MESSAGE TRANSMISSION WITH REPETITION," filed on Jul. 21, 2020, the disclosure of which is incorporated by reference herein in its entirety.

BACKGROUND

Technical Field

The present disclosure relates generally to wireless communication, and more particularly, to reliability enhancements for paging and short message physical downlink control channel (PDCCH) transmissions during one or more paging occasions.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication at a user equipment (UE), comprising receiving paging occasion configuration indicating repetition of a first paging PDCCH monitoring occasion by identifying a second paging PDCCH monitoring occasion. The method further includes decoding, based on the paging occasion configuration, signals received on at least one of resources for the first paging PDCCH monitoring occasion or resources for the second paging PDCCH monitoring occasion.

The disclosure also provides an apparatus (e.g., a UE) including a memory storing computer-executable instructions and at least one processor configured to execute the computer-executable instructions to perform the above method, an apparatus including means for performing the above method, and a non-transitory computer-readable medium storing computer-executable instructions for performing the above method.

An example implementation includes a method of wireless communication at a base station, comprising determining paging occasion configuration indicating repetition of a first paging PDCCH monitoring occasion by identifying a second paging PDCCH monitoring occasion, the first paging PDCCH monitoring occasion and the second paging PDCCH monitoring occasion corresponding to a same PDCCH. The method further includes transmitting the paging occasion configuration to UE, and transmitting, based on the paging occasion configuration, the same PDCCH on resources for the first paging PDCCH monitoring occasion and resources for the second paging PDCCH monitoring occasion.

The disclosure also provides an apparatus (e.g., a base station) including a memory storing computer-executable instructions and at least one processor configured to execute the computer-executable instructions to perform the above method, an apparatus including means for performing the above method, and a non-transitory computer-readable medium storing computer-executable instructions for performing the above method.

To the accomplishment of the foregoing and related ends, the one or more aspects include the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G/NR frame in accordance with some aspects of the present disclosure.

FIG. 2B is a diagram illustrating an example of DL channels within a 5G/NR subframe in accordance with some aspects of the present disclosure.

FIG. 2C is a diagram illustrating an example of a second 5G/NR frame in accordance with some aspects of the present disclosure.

FIG. 2D is a diagram illustrating an example of UL channels within a 5G/NR subframe in accordance with some aspects of the present disclosure.

DETAILED DESCRIPTION

Figure 1:
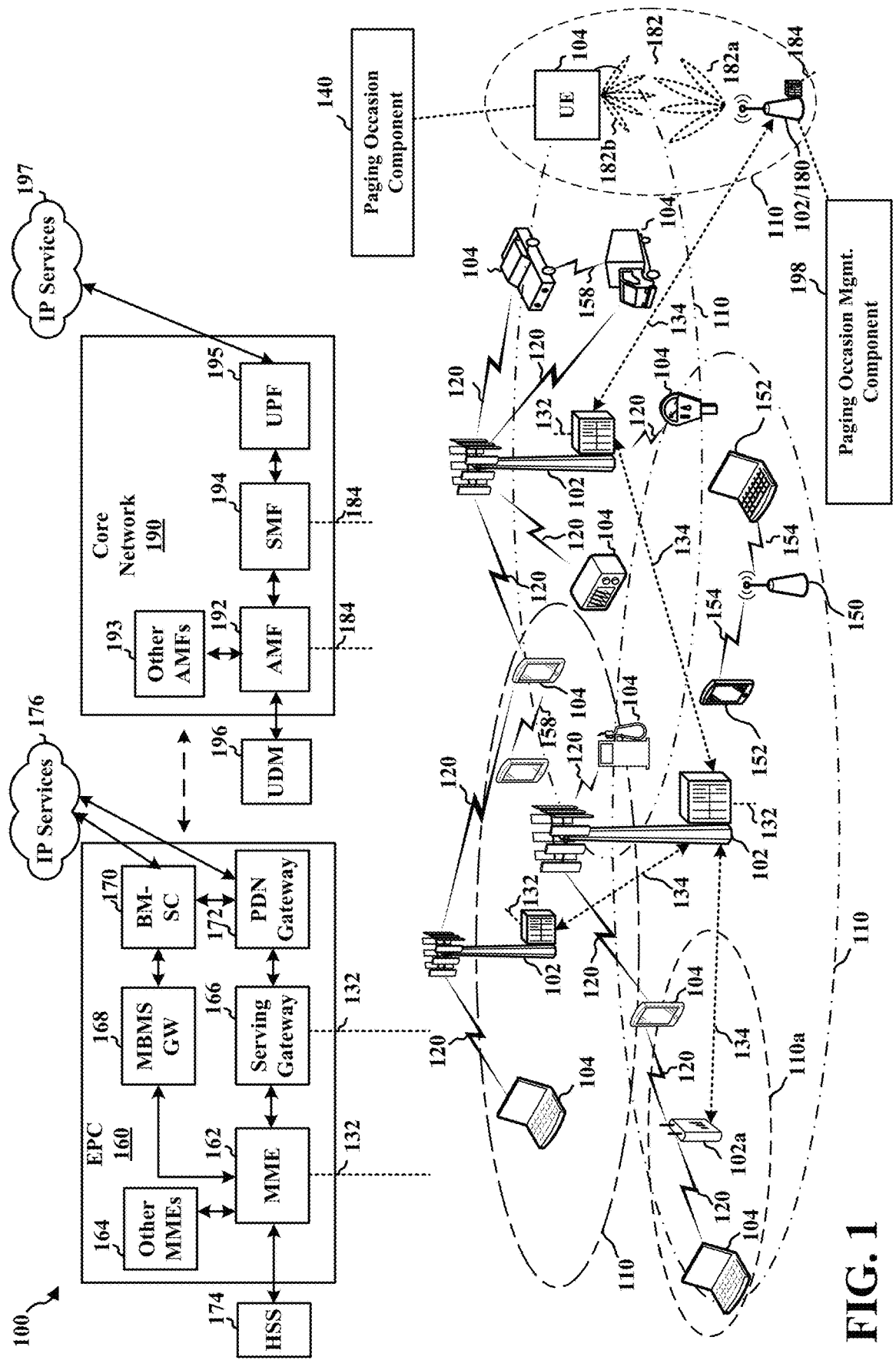
FIG. 1 is a diagram illustrating an example of a wireless communications system and an access network in accordance with some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to a person having ordinary skill in the art that these concepts may be practiced without these specific details. In some instances, structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various implementations relate generally to a procedure for PDCCH monitoring for short message PDCCH repetition or paging PDCCH repetition. In some aspects, a base station transmits a paging occasion configuration to a UE, and repetitions of a short message or paging PDCCH in multiple paging PDCCH monitoring occasions in accordance with the paging occasion configuration. Further, the UE may process the data received during the paging PDCCH monitoring occasions based on the paging occasion configuration received from the base station.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

In an aspect, one or more UEs 104 may include a paging occasion component 140 configured to enable the UE 104 to initiate a short message or paging PDCCH repetition procedure, and properly process repetitions of the PDCCH corresponding to a plurality of paging PDCCH monitoring occasions. In some aspects, the paging PDCCH monitoring occasions may include PDCCH candidates configured for a UE by means of a Type 2 common search space (CSS) and pagingSearchSpace signaling parameters.

For example, the paging occasion component 140 may be configured to receive paging occasion configuration from the base station 102/180. In some aspects, the paging occasion configuration may indicate a type or pattern of paging PDCCH monitoring occasions for short message or paging repetition. Further, the paging occasion component 140 may be configured to receive a PDCCH repetition procedure activation signal to activate the paging PDCCH repetition procedure, and decode signals received on resources during the individual PDCCH monitoring occasions for short message or paging PDCCH repetition.

In some aspects, a base station 102/180 may include a paging occasion management ("Mgmt.") component 198 configured to generate a paging occasion configuration and transmit the paging occasion configuration to one or more UEs 104. Further, the paging occasion management component 198 may be configured to transmit a PDCCH repetition procedure activation signal to one or more UEs 104, and transmit short message or paging PDCCHs in accordance with a short message or paging PDCCH repetition procedure, respectively.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102a may have a coverage area 110a that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102a may operate in a licensed or an unlicensed frequency spectrum. When operating in an unlicensed frequency spectrum, the small cell 102a may employ NR and use the same 5 GHz unlicensed frequency spectrum as used by the Wi-Fi AP 150. The small cell 102a, employing NR in an unlicensed frequency spectrum, may boost coverage to or increase capacity of the access network.

A base station 102, whether a small cell 102a or a large cell (for example, macro base station), may include or be referred to as an eNB, gNodeB (gNB), or another type of base station. Some base stations, such as gNB 180 may operate in one or more frequency bands within the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182a. The UE 104 may receive the beamformed signal from the base station 180 in one or more receive directions 182b. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIGS. 2A-2D include example diagrams 200, 230, 250, and 280 illustrating examples structures that may be used for wireless communication by the base station 102 and the UE 104, e.g., for 5G NR communication. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. For slot configuration 0 and numerology µ, there are 14 symbols/slot and 2µ slots/subframe. The subcarrier spacing and symbol length/duration are a function of the numerology. The subcarrier spacing may be equal to $2^\mu*15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more CCE, each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
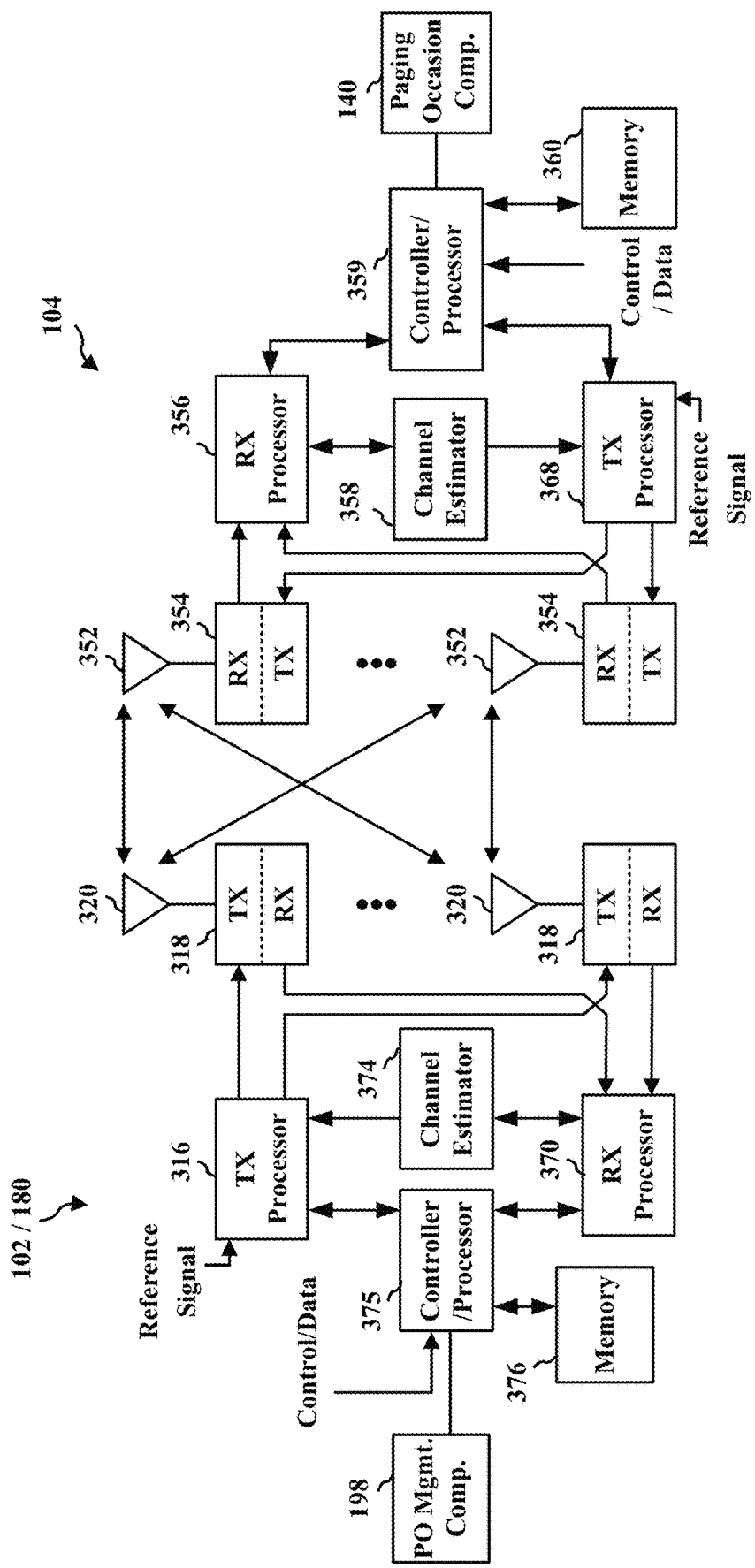
FIG. 3 is a diagram illustrating an example of a base station and user equipment (UE) in an access network in accordance with some aspects of the present disclosure.

FIG. 3 is a block diagram of a base station 102/180 in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 102/180. These soft decisions may be based on channel estimates computed by the channel estimator 358. The soft decisions are then decoded and deinterleaved to recover the data and control signals that were originally transmitted by the base station 102/180 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 102/180, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102/180 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102/180 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK or NACK protocol to support HARQ operations.

In the UE 104, at least one of the TX processor 368, the RX processor 356, and the controller/processor 359 may be configured to perform aspects in connection with the paging occasion component 140 of FIG. 1.

In the base station 102/180, at least one of the TX processor 316, the RX processor 370, and the controller/processor 375 may be configured to perform aspects in connection with paging occasion management component 198 of FIG. 1.

As described herein, a UE 104 may be connected to a base station 102 in a 5G NR network. Further, the UE 104 may operate in an inactive mode in which the UE 104 monitors a paging channel for short messages or paging messages from the base station 102. For example, the UE 104 may monitor a paging channel for a short message PDCCH or a paging PDCCH. The base station 102 may transmit the PDCCH on a PDCCH candidate in a control resource set (CORESET). The CORESET may be the set of physical resources within a downlink resource grid that transmit the PDCCH. The information carried by the PDCCH may be referred to as downlink control information (DCI), and the information may be mapped to physical resources in units referred to as control channel elements (CCEs).

Typically, short messages have been used to indicate system information update or implement public warning system features, while paging messages have been used to schedule paging messages (i.e., PDSCH). But recent advances in NR have relied on short messages and paging messages to implement various enhancements and advanced features, e.g., short messages have been used to indicate enhanced power consumption modes. As such, the reliability and robustness of NR may suffer when a UE 104 encounters issues capturing and decoding short messages or paging messages.

For instance, wireless communication between a UE 104 and a base station 102 may involve beamforming. Beam reliability may suffer for a variety of reasons such as a narrow beam becoming weak or suffering from partial shadowing. Accordingly, a base station 102 may transmit repetitions of a short message or paging PDCCH per SSB to alleviate coverage issues and aid the UE 104 in successfully receiving a short message PDCCH or paging PDCCH. The transmission of repetitions of a short message PDCCH or paging PDCCH over a plurality of paging monitoring occasions may be referred to as a "paging PDCCH repetition" or "short message and paging PDCCH repetition" procedure, and may improve PDCCH reception for a single UE 104, or for a group of UEs 104, that may be suffering from a weak or worsening beam by providing additional opportunities for the UE 104 or UEs 104 to decode a PDCCH via the plurality of monitoring occasions, and/or enabling the UE 104 or UEs 104 to decode and combine the PDCCH information from more than one monitoring occasion.

More specifically, various implementations relate generally to a procedure for PDCCH monitoring for short message PDCCH repetition or paging PDCCH repetition. In some aspects, a base station 102 transmits a paging occasion configuration to a UE 104, and repetitions of a short message or paging PDCCH in multiple paging PDCCH monitoring occasions in accordance with the paging occasion configuration. Further, the UE 104 may monitor for each of the repetitions of the short message or paging PDCCH and process the data received during the monitoring occasions based on the paging occasion configuration received from the base station 102. In some examples, the base station 102 transmits a PDCCH repetition procedure activation signal to activate a plurality of monitoring occasions for short message PDCCH repetition or paging PDCCH repetition at the UE 104. In some examples, the PDCCH repetition procedure activation signal may be a radio resource control (RRC) configuration message including an activation indication, a media access control (MAC) control element (CE) including an activation signal, a UE specific downlink control information (DCI) including an activation signal, or a group-common DCI including an activation signal.

Figure 4:
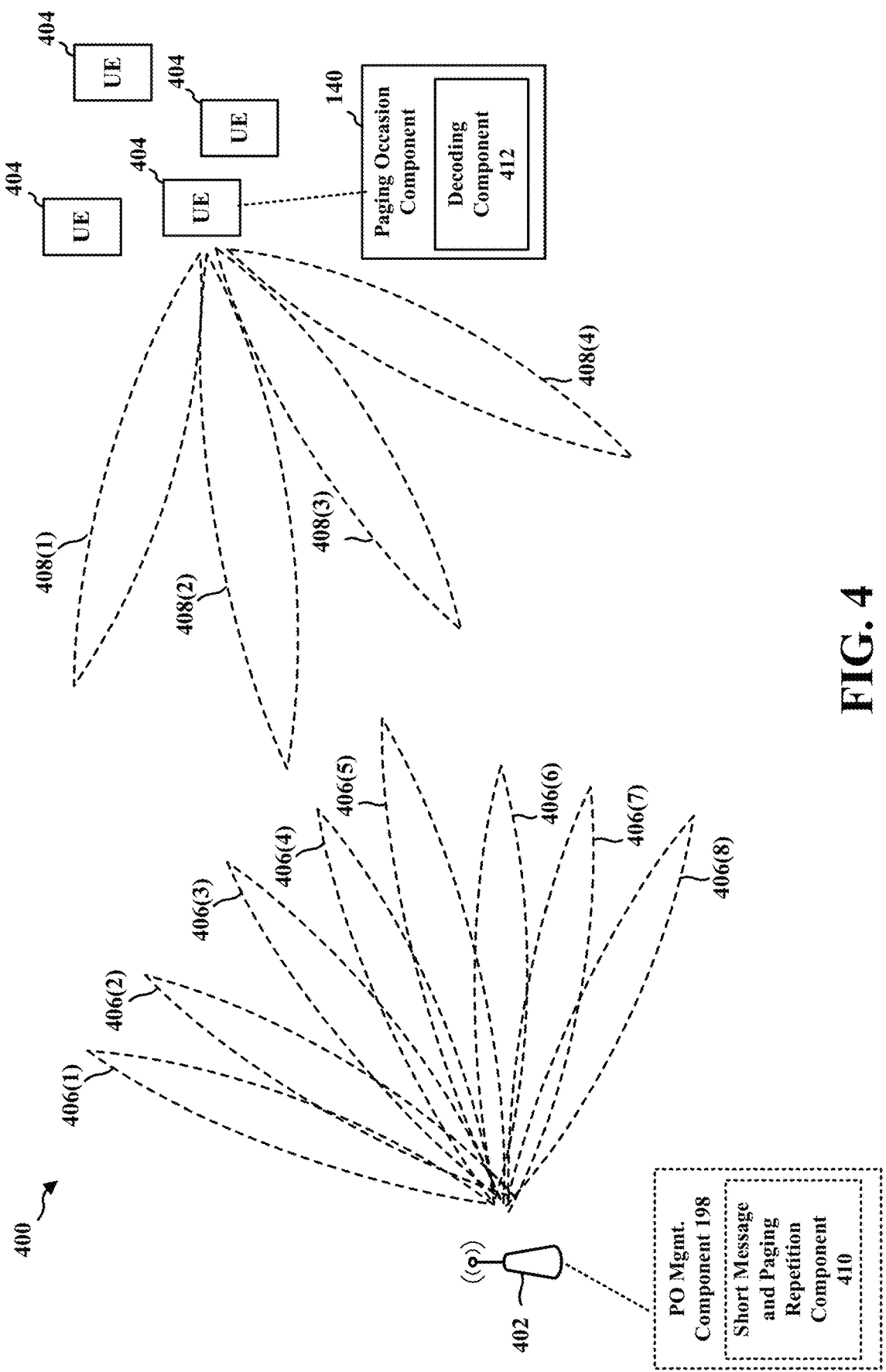
FIG. 4 is a diagram illustrating an example of beamforming between a base station and a UE in an access network in accordance with some aspects of the present disclosure.

FIG. 4 shows a diagram illustrating an example of beamforming 400 between a base station 402 (e.g., the base station 102/180) and a UE 404 (e.g., the UE 104) in an access network in accordance with some aspects of the present disclosure. As illustrated in FIG. 4, the base station 402 may transmit signals to the UE 404 in each of multiple directions using respective transmit beams 406(1)-(8). Further, the UE 404 may receive signals from the base station 402 using different receive beams 408(1)-(4). The UE 404 may also transmit a signal to the base station 402 in one or more of the directions using different beams. In addition, the base station 402 may receive the signal from the UE 404 in one or more of the receive directions using the one or more beams.

The base station 402 and the UE 404 may perform beam training to determine the best receive and transmit directions for each of the base station 402 and the UE 404. The transmit and receive directions for the base station 402 may or may not be the same. The transmit and receive directions for the UE 404 may or may not be the same. The base station 402 may use the same beam, or related beams, to transmit communications to multiple UEs 404. The base station 402 may use a different beam to exchange communications with the UE 404, for example. The base station 402 may provide reference signals to the UE 404 so that the UE 404 may perform further refined selection of the beam pairs 406(1)/408(1), 406(3)/408(3), 406(4)/408(4) based on measurements performed on those signals.

Under some conditions, short message or paging PDCCH messages may not be received correctly, which may delay or prevent the UE 404 from receiving the control information in the PDCCH and exchanging other communications including data (for example, via a PDSCH) with the base station 402. For example, a passing vehicle, or other mobile structure, may cause interference, attenuation or blockage for a group of UEs. In many instances, wider beams are employed to transmit short message and paging PDCCHs. However, the use of wider beams is often accompanied by sacrifices in coverage (e.g., distance or cell radius).

As described herein, the base station 402 may alleviate coverage issues by transmitting a short message or paging PDCCH using a paging PDCCH repetition procedure that involves transmitting repetitions of the PDCCH over a plurality of monitoring occasions. Aspects presented herein enable the base station 402 to improve transmission reliability by improving the robustness of the PDCCH decoding process by the UE 404 via the paging PDCCH repetition procedure.

The base station 402 may include a paging occasion management component 198, such as described in connection with FIG. 1. The paging occasion management component 198 may include a short message and paging repetition component 410 that may manage paging PDCCH monitoring occasions corresponding to the same SSB. In other words, the paging occasion management component 198 operating the short message and paging repetition component 410 may manage performance of a PDCCH repetition mode. For example, the paging occasion management component 198 may generate paging occasion configuration indicating repetition of a first paging physical downlink control channel (PDCCH) monitoring occasion by identifying one or more corresponding paging PDCCH monitoring occasions. In some aspects, the paging occasion configuration may indicate a type of repetition performed during a PDCCH repetition mode, a repetition pattern implemented during the PDCCH repetition mode, and/or a periodicity of repetitive paging PDCCH monitoring occasions during a PDCCH repetition mode. In addition, the paging occasion configuration may indicate whether a repetitive paging PDCCH monitoring occasion corresponds to a PDCCH associated with PDSCH occasion. Further, the indication may take the form of one or more parameters included in system information, downlink control information, paging search space information, etc. The paging occasion configuration may be provided to a UE 404 semi-statically or dynamically. For instance, the paging occasion management component 198 may semi-statically provide indication of the paging PDCCH repetition procedure by generating a system information block (SIB) (e.g., a SIB type 1) identifying the first paging PDCCH monitoring occasion and the second paging PDCCH monitoring occasion, and transmit the SIB to the UE 404. In some other instances, the paging occasion management component 198 may dynamically provide indication of the paging PDCCH repetition procedure by generating a short message identifying the first paging PDCCH monitoring occasion and the second paging PDCCH monitoring occasion, and transmit the short message to the UE 104.

Further, paging occasion management component 198 may transmit PDCCH repetition procedure activation signals indicating the initiation of a paging PDCCH repetition procedure and PDCCH repetition procedure deactivation signals indicating the termination of the paging PDCCH repetition procedure. In some aspects, the PDCCH repetition procedure activation signal may be a short message including an activation indication, a SIB including an activation indication, a RRC configuration message including an activation indication, a MAC CE including an activation indication, a UE specific DCI including an activation indication, or a group-common DCI including an activation indication. The PDCCH repetition procedure deactivation signal may be a short message including a deactivation indication, a SIB including a deactivation indication, a RRC configuration message including a deactivation indication, a MAC CE including a deactivation indication, a UE specific DCI including a deactivation indication, or a group-common DCI including a deactivation indication.

The base station 402 may determine to transmit the PDCCH repetition procedure activation signal based on one or more of: channel state information (CSI) received from at least one UE 404 in the group of UEs 404, a quality measurement for at least one UE 404 in the group of UEs 404, or hybrid automatic repeat request (HARD) feedback from at least one UE 404 in the group of UEs 404. For example, the base station 402 may have previously received channel state information, quality measurements, or HARQ feedback from another UE (e.g., a UE from the group of UEs 404) and determine to transmit the PDCCH repetition procedure activation signal to the UE 404 based on this previously received information, measurements or feedback. The base station 402 may indicate the paging PDCCH repetition procedure for all or a subset of search spaces of the group of UEs 404. Additionally, the base station 402 may configure whether to activate a paging PDCCH repetition procedure separately for each search space corresponding to a SSB.

The UEs 404 may each include a paging occasion component 140, such as described in connection with FIG. 1. As illustrated in FIG. 4, the paging occasion component 140 may include a decoding component 412 for decoding and processing the repetitive paging PDCCH monitoring occasions based on the paging occasion configuration. For example, the paging occasion component 140 operating the decoding component 412 may be configured to receive paging occasion configuration indicating repetition of a paging PDCCH monitoring occasion via one or more other paging PDCCH monitoring occasions configured to correspond to the same SSB as the paging PDCCH monitoring occasion. In addition, the paging occasion component 140 may be configured to receive a PDCCH repetition procedure activation signal from the base station 402, monitor for a same PDCCH over the paging PDCCH monitoring occasion and the one or more other paging PDCCH monitoring occasions, and decode signals received on resources during the paging PDCCH monitoring occasion and the one or more other paging PDCCH monitoring occasions.

Under the paging PDCCH repetition procedure, the base station 402 may transmit an initial transmission of a short message or paging PDCCH and may repeat the PDCCH transmission so that the same PDCCH is repeated over two or more paging PDCCH monitoring occasions. For example, the same PDCCH may be repeatedly transmitted over PDCCH candidates in multiple paging monitoring occasions, for example, in the same search space and with the same PDCCH candidate index.

Figure 5:
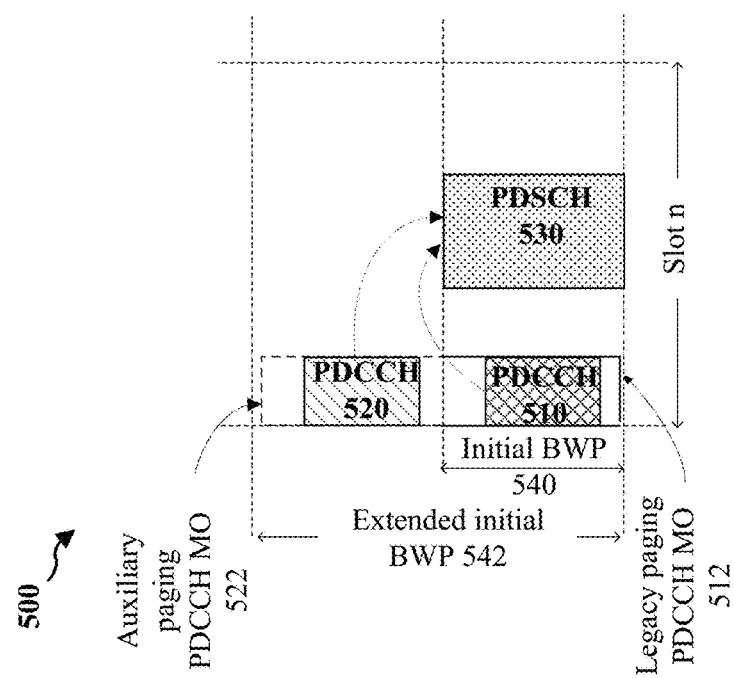
FIG. 5 is a diagram illustrating example paging PDCCH monitoring occasions for short message or paging repetition using frequency division multiplexing in accordance with some aspects of the present disclosure.

In some aspects, e.g., as described with respect to FIG. 5, the base station 402 may transmit, for a first paging PDCCH monitoring occasion and a second paging PDCCH monitoring occasion, the same PDCCH within a same frequency region (e.g., NR bandwidth part) of a frequency division multiplex pattern. In some other aspects, e.g., as described with respect to FIG. 6, the base station 402 may transmit, for a first paging PDCCH monitoring occasion and a second paging PDCCH monitoring occasion, the same PDCCH within a monitoring slot of a time division multiplex pattern.

Figure 7:
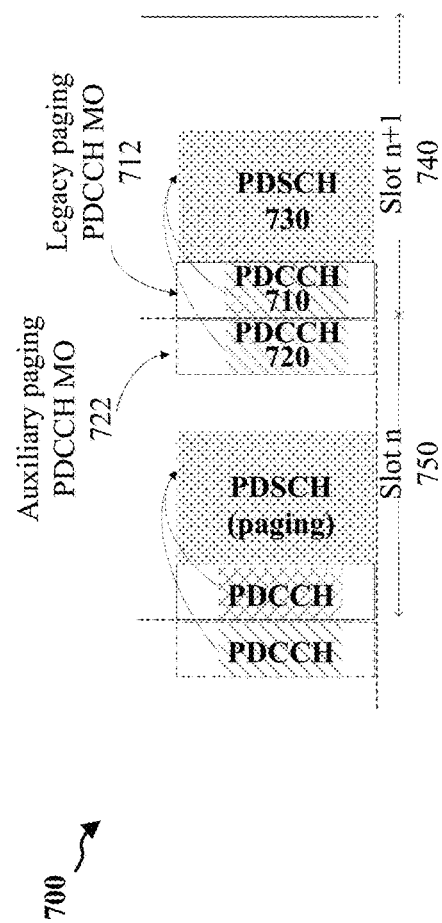
FIG. 7 is a diagram illustrating a second example of paging PDCCH monitoring occasions for short message or paging repetition using time division multiplexing in accordance with some aspects of the present disclosure.

In some other aspects, e.g., as described with respect to FIG. 7, the base station 402 may transmit the same PDCCH for a first paging PDCCH monitoring occasion in a first monitoring slot of a time division multiplex pattern, and transmit the same PDCCH for a second paging PDCCH monitoring occasion within a second monitoring slot of the time division multiplex pattern. In yet still some other aspects, e.g., as described with respect to FIG. 9, the base station 402 may transmit a plurality of repetition patterns with each repetition pattern comprising a plurality of paging PDCCH monitoring occasions. Further, each repetition pattern may correspond to a different SSB.

FIG. 5 is a diagram 500 illustrating example paging PDCCH monitoring occasions for short message or paging repetition using frequency division multiplexing in accordance with some aspects of the present disclosure. As illustrated in FIG. 5, in the PDCCH repetition mode, a base station 402 may transmit a PDCCH 510 during a legacy paging PDCCH monitoring occasion 512 and a PDCCH 520 during an auxiliary paging PDCCH monitoring occasion 522 in accordance with a frequency division multiplex scheme. Given that the PDCCH 520 is a repetition of the PDCCH 510, the PDCCH 510 and the PDCCH 520 may both be configured as paging PDCCHs for scheduling a PDSCH 530. Alternatively, the PDCCH 510 and the PDCCH 520 may both be configured as short message PDCCHs with a similar payload.

As further illustrated in FIG. 5, in a standard mode, the PDCCH 510 may be transmitted within an initial frequency region (e.g., initial bandwidth part 540). Further, in the PDCCH repetition mode, the initial frequency region may be extended to form an extended frequency region (e.g., extended bandwidth part 542). In addition, as illustrated in FIG. 5, in the PDCCH repetition mode, the PDCCH 510 and the PDCCH 520 may both be transmitted within the extended frequency region (e.g., extended bandwidth part 542). As such, in some examples, a UE 404 in the PDCCH repetition mode may extend the bandwidth the UE monitors from the initial bandwidth part 540 to the extended bandwidth part 542.

Figure 6:
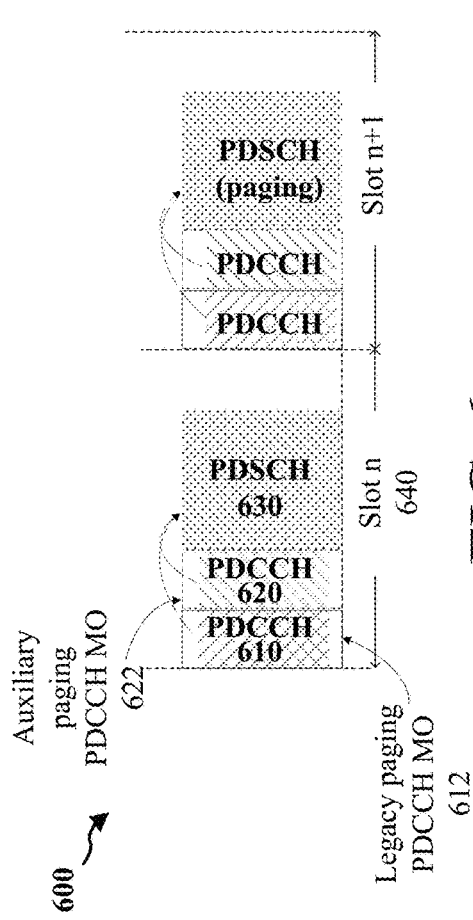
FIG. 6 is a diagram illustrating a first example of paging PDCCH monitoring occasions for short message or paging repetition using time division multiplexing in accordance with some aspects of the present disclosure.

FIG. 6 is a diagram 600 illustrating a first example of paging PDCCH monitoring occasions for short message or paging repetition using time division multiplexing in accordance with some aspects of the present disclosure. As illustrated in FIG. 6, in the PDCCH repetition mode, a base station 402 may transmit a PDCCH 610 during a legacy paging PDCCH monitoring occasion 612 and a PDCCH 620 during an auxiliary paging PDCCH monitoring occasion 622 in accordance with a time division multiplex scheme. Given that the PDCCH 620 is a repetition of the PDCCH 610, the PDCCH 610 and the PDCCH 620 may both be configured as paging PDCCHs for scheduling a PDSCH 630. Alternatively, the PDCCH 610 and the PDCCH 620 may both be configured as short message PDCCHs with a similar payload. In addition, as further illustrated in FIG. 6, in the PDCCH repetition mode, the PDCCH 610, the PDCCH 620, and the PDSCH 630 may be transmitted within the same time monitoring slot 640.

FIG. 7 is a diagram 700 illustrating a second example of paging PDCCH monitoring occasions for short message or paging repetition using time division multiplexing in accordance with some aspects of the present disclosure. As illustrated in FIG. 7, in the PDCCH repetition mode, a base station 402 may transmit a PDCCH 710 during a legacy paging PDCCH monitoring occasion 712 and a PDCCH 720 during an auxiliary paging PDCCH monitoring occasion 722 in accordance with a time division multiplex scheme.

Given that the PDCCH 720 is a repetition of the PDCCH 710, the PDCCH 710 and the PDCCH 720 may both be configured as paging PDCCHs for scheduling a PDSCH 730. Alternatively, the PDCCH 710 and the PDCCH 720 may both be configured as short message PDCCHs with a similar payload. In addition, as further illustrated in FIG. 7, in the PDCCH repetition mode, the PDCCH 710 and the PDSCH 730 may be transmitted within a first time monitoring slot 740, while the PDCCH candidate 720 may be transmitted in a second time monitoring slot 750.

Figure 8:
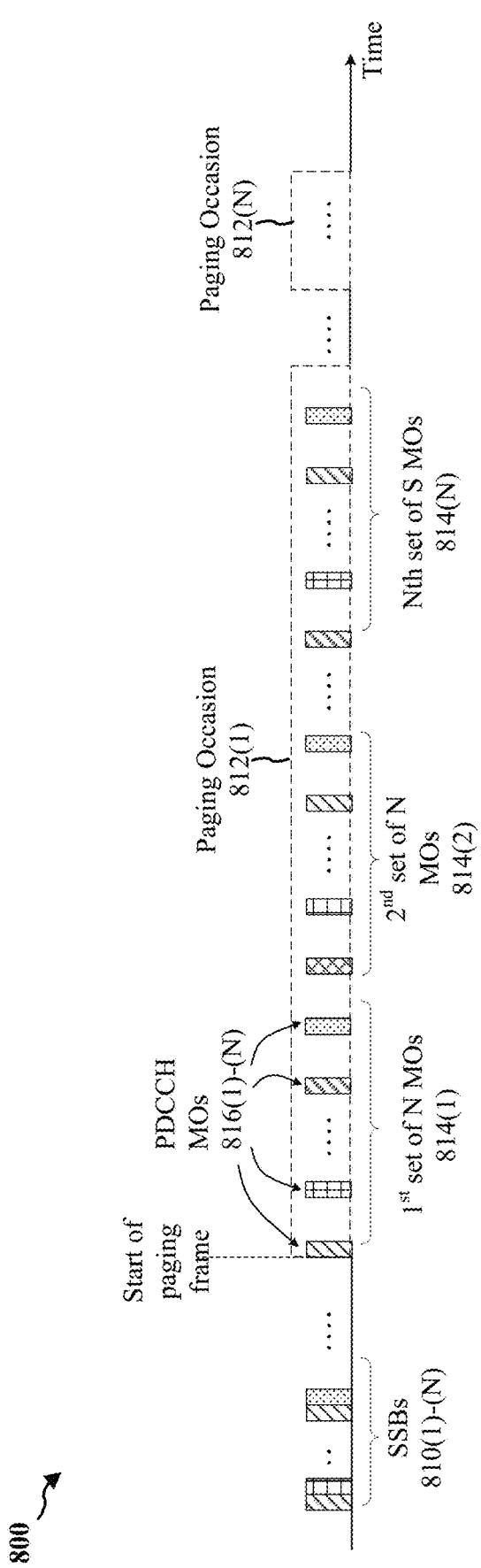
FIG. 8 is a diagram illustrating example PDCCH monitoring occasions in accordance with some aspects of the present disclosure.

FIG. 8 is a diagram 800 illustrating example PDCCH monitoring occasions in accordance with some aspects of the present disclosure. As illustrated in FIG. 8, a plurality of SSBs 810(1)-(N) (e.g., a SSB burst) may be associated with plurality of paging occasion 812(1)-(N) each including sets of monitoring occasions, e.g., the paging occasion 812(1) may include the set of monitoring occasions 814(1)-(N). Each individual set of monitoring occasions 814 may include individual monitoring occasions 816(1)-(N). For example, the first set of monitoring occasions 814(1) may include a plurality of monitoring occasions 816(1)-(N). In some aspects, the number of monitoring occasions of the plurality of monitoring occasions 816(1)-(N) may be equal to the number of SSBs in the plurality of SSBs 810(1)-(N). Further, each monitoring occasion 816 may correspond to an SSB 810. For example, a base station 402 operating in a standard mode may transmit a PDCCH corresponding to the SSB 810(1) during the monitoring occasion 816(1) of the first set of monitoring occasions 814(1), transmit a PDCCH corresponding to the SSB 810(N) during the monitoring occasion 816(N) of the first set of monitoring occasions 814(1), and so forth.

Figure 9:
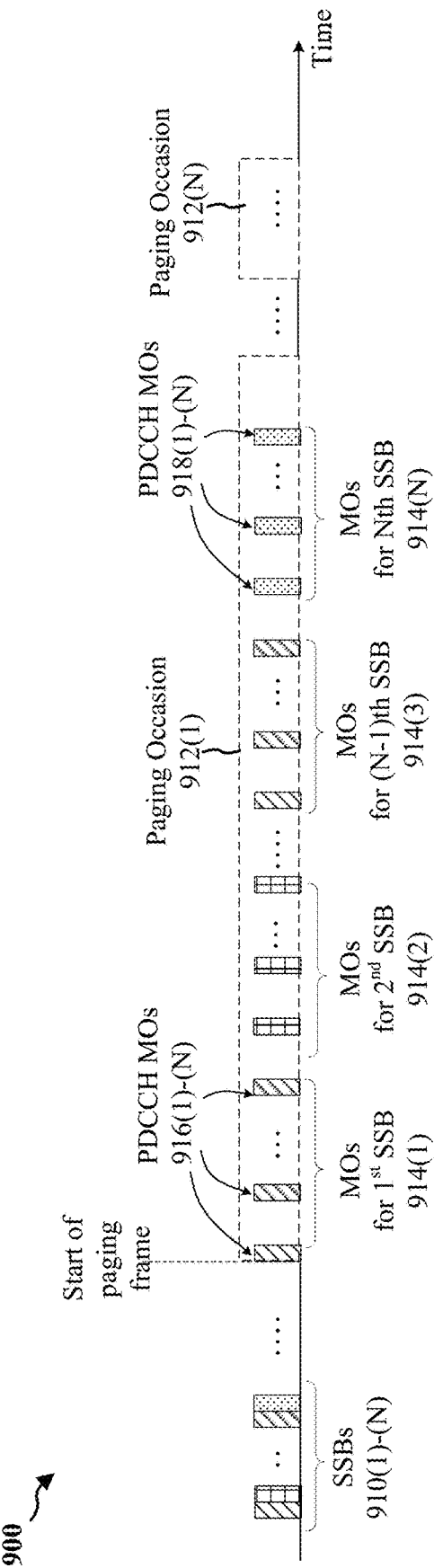
FIG. 9 is a diagram illustrating example paging PDCCH monitoring occasions for short message or paging repetition in accordance with some aspects of the present.

FIG. 9 is a diagram illustrating example of paging PDCCH monitoring occasions for short message or paging repetition in accordance with some aspects of the present. As illustrated in FIG. 9, a plurality of SSBs 910(1)-(N) (e.g., a SSB burst) may be associated with a first paging occasion 912(1) including one or more of sets of monitoring occasions 914(1)-(N). Each individual set of monitoring occasions 914 may include individual monitoring occasions. For example, the first set of monitoring occasions 914(1) may include a plurality of monitoring occasions 916(1)-(N). In some aspects, the number of monitoring occasions of the set of monitoring occasions 916(1)-(N) may be equal to the number of SSBs in the plurality of SSBs 910(1)-(N) and the number of set of monitoring occasions 914(1)-(N). Further, each set of monitoring occasions 914 may correspond to an SSB 910. For example, a base station 402 operating in a PDCCH repetition mode may repeatedly transmit short message or paging PDCCHs 916(1)-(N) corresponding to the first SSB 910(1) during the first set of monitoring occasions 914(1), transmit short message or paging PDCCHs 918(1)-(N) corresponding to the Nth SSB 910(N) during the Nth set of monitoring occasions 914(N), and so forth. Accordingly, the base station operating in a PDCCH repetition mode may transmit a short message or paging PDCCH corresponding to the SSB 910(1) during the monitoring occasions 916(1)-(N).

Figure 10:
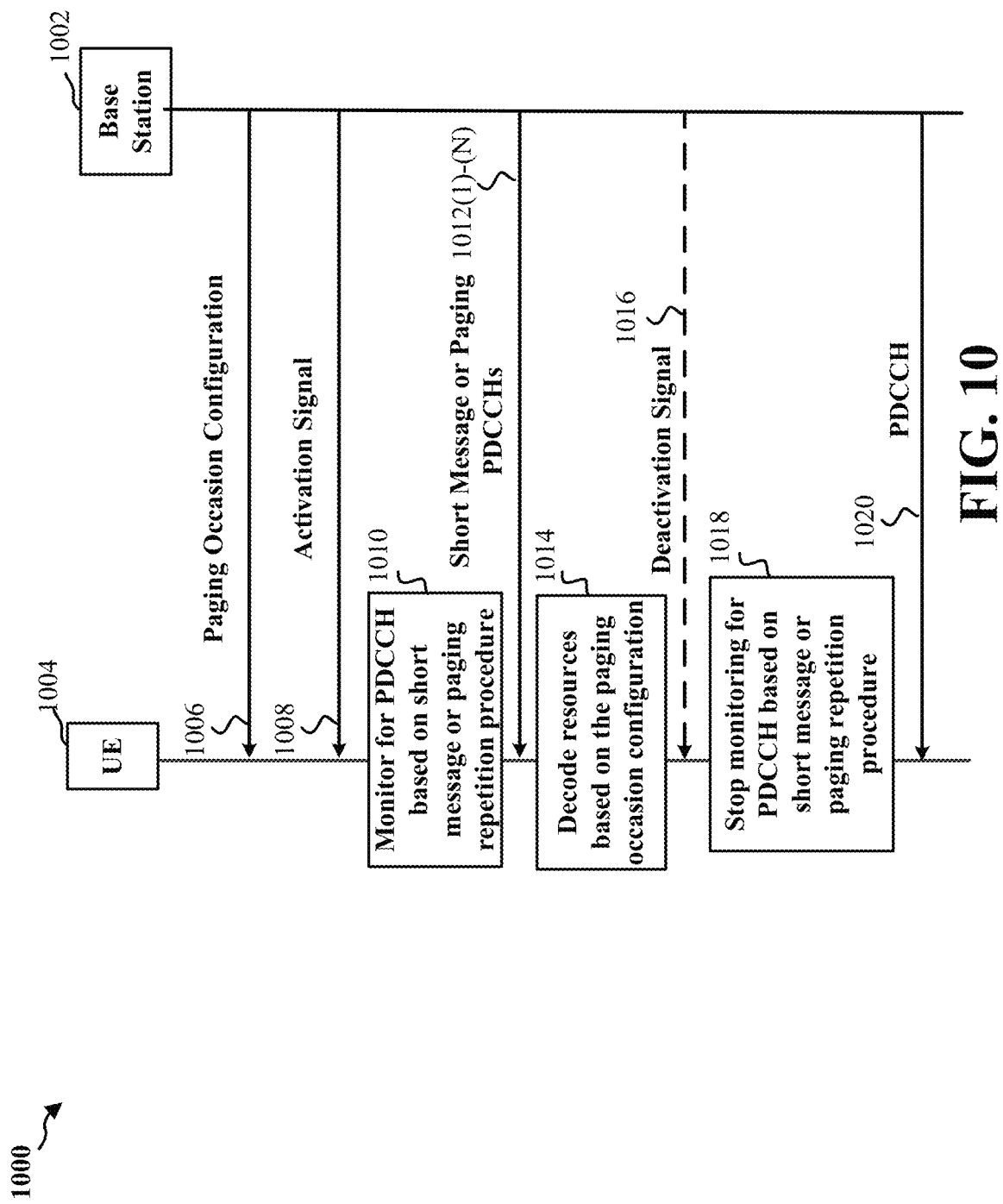
FIG. 10 is a communication flow between a base station and a UE that supports a procedure for PDCCH monitoring for short message PDCCH repetition or paging PDCCH repetition in accordance with some aspects of the present disclosure.

FIG. 10 is a communication flow 1000 between a base station 1002 (e.g., the base station 402) and a UE 1004 (e.g., the UE 404) that monitors PDCCH monitoring occasions for short message or paging PDCCH repetition in accordance with some aspects of the present disclosure. In this example, the base station 1002 transmits a paging occasion configuration 1006 to UE 1004. Additionally, or alternatively, in some examples, the UE 1004 may be preconfigured with the paging occasion configuration 1006 using a different mechanism. The paging occasion configuration 1006 may indicate repetition of a paging PDCCH monitoring occasion by identifying a plurality of paging PDCCH monitoring occasions corresponding to the paging PDCCH monitoring occasion. In some aspects, the paging occasion configuration 1006 may be a parameter indicating a type of repetition, a pattern of repetition, and/or timing information for repetition. Further, the UE 1004 may employ the parameter to determine when to monitor for a paging PDCCH or a short message PDCCH. In addition, the paging occasion configuration 1006 may indicate whether the plurality of paging PDCCH monitoring occasions correspond to a PDCCH associated with a PDSCH occasion. The plurality of paging PDCCH monitoring occasions may be employed to schedule the same PDSCH or the plurality of paging PDCCH monitoring occasions may be employed to schedule different PDSCH occasions. In some examples, on the UE side 1004, the paging PDCCH repetition procedure may include monitoring for a same PDCCH over multiple PDCCH candidates in multiple monitoring occasions in a same search space. In some other examples, on the UE side, the paging PDCCH repetition procedure may include monitoring for a same PDCCH over multiple PDCCH candidates in multiple monitoring occasions in different search spaces.

Further, the base station 1002 may transmit a PDCCH repetition procedure activation signal 1008 including an indication regarding the PDCCH monitoring procedure. In some aspects, the indication in the PDCCH repetition procedure activation signal 1008 indicates an activation, deactivation, or continuation of the paging PDCCH repetition procedure for paging PDCCH monitoring. In some aspects, the PDCCH repetition procedure activation signal 1008 may be a short message including an activation indication, a SIB including an activation indication, a RRC configuration message including an activation indication, a MAC CE including an activation indication, a UE DCI including an activation indication, or a group-common DCI including an activation indication.

At block 1010, the UE 1004 may monitor for PDCCHs according to the paging PDCCH repetition procedure. For example, if the PDCCH repetition procedure activation signal 1008 activates, enables, or continues the paging PDCCH repetition procedure, the UE 1004 may monitor for a short message or paging PDCCH based on the paging PDCCH repetition procedure and the paging occasion configuration 1006.

The base station 1002 may transmit a plurality of short message or paging PDCCHs 1012(1)-(N) to the UE 1004 over a plurality of monitoring occasions in accordance with the paging occasion configuration 1006. In some aspects, the base station 1002 may transmit the plurality of short message or paging PDCCHs 1012(1)-(N) within a same frequency region of a frequency division multiplex pattern for one or more monitoring occasion pairs. For example, the base station 1002 may transmit the short message or paging PDCCHs 1012(1)-(2) within a same frequency region for a first paging PDCCH monitoring occasion and a second paging PDCCH monitoring occasion. As a result, the UE 1004 may monitor, based on the paging occasion configuration 1006, the first paging PDCCH monitor occasion and the second paging PDCCH monitoring occasion within a same frequency region. Additionally, in some aspects, the counting numbers for blind decoding and CCEs per slot may count the first paging PDCCH monitoring occasion and the second monitoring occasion as one.

In some other aspects, the base station 1002 may pair paging PDCCH monitoring occasions within a time monitoring slot of a time division multiplex pattern, and transmit the short message or paging PDCCHs 1012(1)-(N) during the paired monitoring occasions. For example, the base station 1002 may transmit the short message or paging PDCCHs 1012(1)-(2) within a same monitoring slot for a first paging PDCCH monitoring occasion and a second paging PDCCH monitoring occasion. As a result, the UE 1004 may monitor, based on the paging occasion configuration 1006, the first paging PDCCH monitoring occasion and the second paging PDCCH monitoring occasion within the same monitoring slot. Additionally, in some aspects, the counting numbers for blind decoding and CCEs per slot may count the first paging PDCCH monitoring occasion and the second monitoring occasion as one.

In some other aspects, the base station 1002 may pair paging PDCCH monitoring occasions in different time monitoring slots of a time division multiplex pattern, and transmit the short message or paging PDCCHs 1012(1)-(2) during the paired monitoring occasions. For example, the base station 1002 may transmit the short message or paging PDCCH 1012(1) for a first paging PDCCH monitoring occasion in a first monitoring slot of a time division multiplex pattern, and transmit the short message or paging PDCCH 1012(2) for a second paging PDCCH monitoring occasion within a second monitoring slot of the time division multiplex pattern. As a result, the UE 1004 may monitor, based on the paging occasion configuration 1006, the first paging PDCCH monitoring occasion in the first monitoring slot and the second paging PDCCH monitoring occasion within the second monitoring slot. Additionally, in some aspects, the counting numbers for blind decoding and CCEs per slot may count the first paging PDCCH monitoring occasion and the second monitoring occasion as one.

In yet still some other aspects, the base station 1002 may group the short message and paging PDCCHs 1012(1)-(N) by a corresponding SSB, and send each group of short message and paging PDCCHs during a plurality of successive paging PDCCH monitoring occasions. For example, the base station 1002 may identify that short message and paging PDCCHs 1012(1)-(6) correspond to a first SSB and the transmit the short message and paging PDCCHs 1012(1)-(6) during a first plurality of paging of monitoring occasions (i.e., a first repetition pattern), and identify that short message and paging PDCCHs 1012(7)-(12) correspond to a second SSB and the transmit the short message and paging PDCCHs 1012(7)-(12) during a second plurality of paging of monitoring occasions (i.e., a second repetition pattern).

Further, at block 1010, the UE 1004 may decode resources based on the paging occasion configuration 1006. Further, in some examples, the base station 1002 may transmit a PDCCH repetition procedure deactivation signal 1016 including an indication of deactivation of a paging PDCCH repetition procedure for PDCCH monitoring. Responsive to receiving such a deactivation indication, the UE 1004 may stop monitoring for the PDCCH based on the paging PDCCH repetition procedure in block 1018. In some aspects, the PDCCH repetition procedure deactivation signal 1016 may be a short message including a deactivation indication, a SIB including an activation indication, a RRC configuration message including a deactivation indication, a MAC CE including a deactivation indication, a UE specific DCI including a deactivation indication, or a group-common DCI including a deactivation indication. Additionally or alternatively, in some examples, the UE 1004 may stop monitoring for the PDCCH 1012 based on the paging PDCCH repetition procedure in block 1010 after a timer for the paging PDCCH repetition procedure for PDCCH monitoring expires.

Further, the base station 1002 may transmit a second PDCCH 1020 without the paging PDCCH repetition procedure after deactivating the paging PDCCH repetition procedure for PDCCH. The PDCCH 1020 may be transmitted without repetition and the procedure of monitoring the PDCCH 1020 may be referred to as a "regular PDCCH monitoring" procedure.

Figure 11:
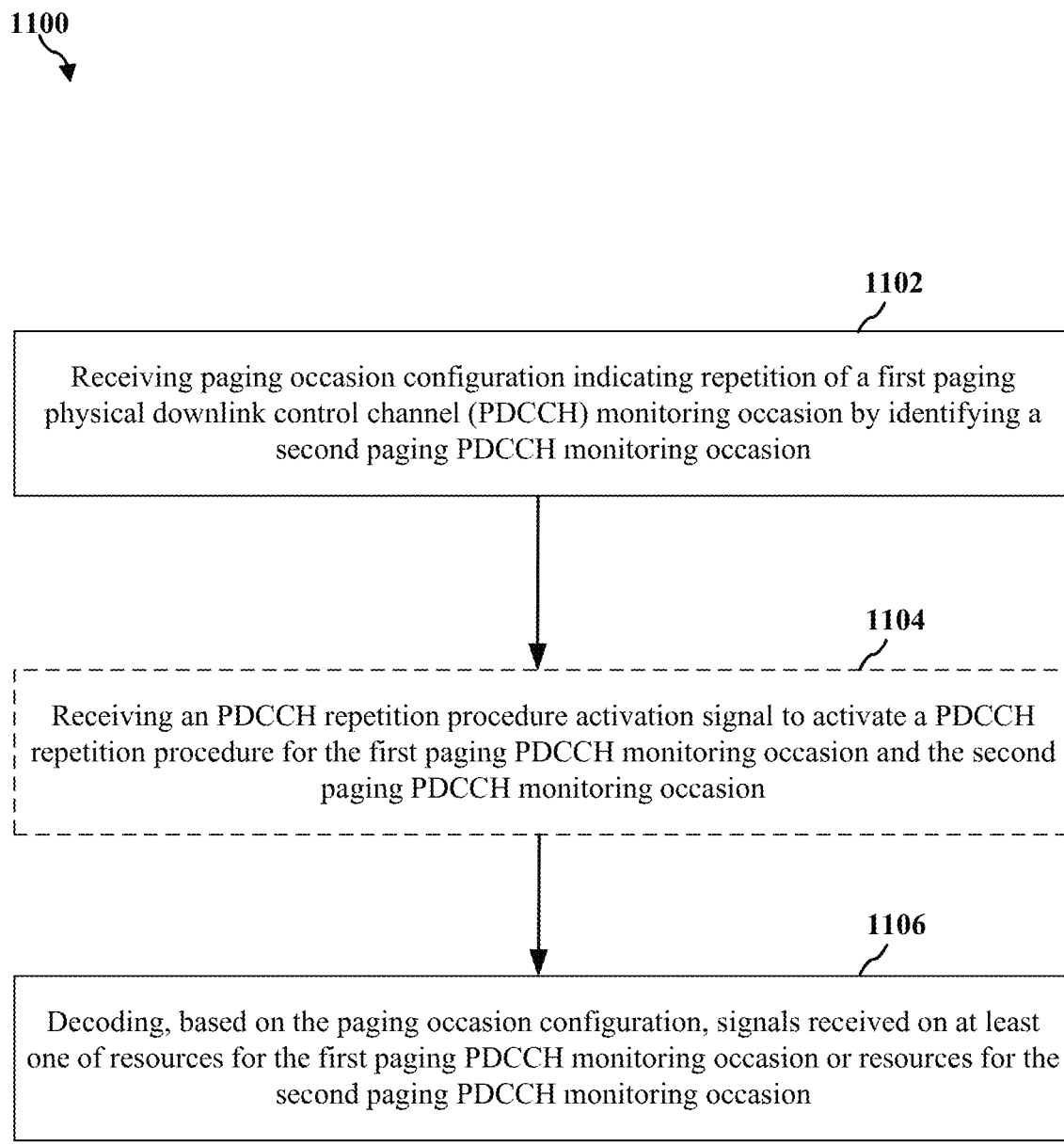
FIG. 11 is a flowchart illustrating an example method performed by a UE that supports a procedure for PDCCH monitoring for short message PDCCH repetition or paging PDCCH repetition in accordance with some aspects of the present disclosure.

FIG. 11 is a flowchart of a method 1100 of PDCCH monitoring for short message PDCCH repetition or paging PDCCH repetition. The method may be performed by a UE (e.g., the UE 104 of FIGS. 1 and 3, which may include the memory 360 and which may be the entire UE 104 or a component of the UE 104, such as the paging occasion component 140, the TX processor 368, the RX processor 356, and/or the controller/processor 359; the UE 404 of FIG. 4; and/or the UE 1004 of FIG. 10).

At block 1102, the method 1100 includes receiving paging occasion configuration indicating repetition of a first paging physical downlink control channel (PDCCH) monitoring occasion by identifying a second paging PDCCH monitoring occasion. For example, the paging occasion component 140 may receive the paging occasion configuration 1006. Further, the paging occasion configuration 1006 may indicate a type of repetition performed during a PDCCH repetition mode, a repetition pattern implemented during the PDCCH repetition mode, and/or a periodicity of repetitive paging PDCCH monitoring occasions during a PDCCH repetition mode.

In addition, the paging occasion configuration 1006 may be provided to the UE 1004 semi-statically (e.g., via a SIB) or dynamically (e.g., via a short message). In some aspects, the paging occasion configuration 1006 may include a SIB identifying the first paging PDCCH monitoring occasion and the second paging PDCCH monitoring occasion. For example, the paging occasion configuration 1006 may identify a first repetition pattern including a first paging PDCCH monitoring occasion followed by a second paging PDCCH monitoring occasion, and a second repetition pattern of a plurality of PDCCH monitoring occasions. Further, the first repetition pattern may be associated with a first SSB and the second repetition pattern associated with a second SSB. In some other aspects, the paging occasion configuration 1006 may include a short message identifying the first paging PDCCH monitoring occasion and the second paging PDCCH monitoring occasion.

Further, in some aspects, the paging occasion configuration 1006 may include a mapping type indicator identifying that the first paging PDCCH monitoring occasion and the second paging PDCCH monitoring occasion are associated with a PDCCH candidates mapped to a same plurality of control channel elements. Alternatively, in some aspects, the paging occasion configuration 1006 may include a mapping type indicator identifying that the first paging PDCCH monitoring occasion and the second paging PDCCH monitoring occasion are each associated with independently mapped PDCCH candidates.

Accordingly, the UE 104, the UE 404, the UE 1004, the TX processor 368, the RX processor 356, and/or the controller/processor 359 executing the paging occasion component 140 may provide means for receiving paging occasion configuration indicating repetition of a first paging PDCCH monitoring occasion by identifying a second paging PDCCH monitoring occasion.

At block 1104, the method 1100 may optionally include receiving a PDCCH repetition procedure activation signal to activate the plurality of monitoring occasions for short message PDCCH repetition or paging PDCCH repetition at the UE 1004. For example, the paging occasion component 140 may receive the PDCCH repetition procedure activation signal 1008 indicating the initiation of a PDCCH repetition mode by the base station 1002. In some aspects, the PDCCH repetition procedure activation signal 1008 may be a RRC configuration message including an activation indication, a MAC CE including an activation signal, a UE specific DCI including an activation signal, or a group-common DCI including an activation signal.

Accordingly, the UE 104, the UE 404, the UE 1004, the TX processor 368, the RX processor 356, and/or the controller/processor 359 executing the paging occasion component 140 may provide means for receiving a PDCCH repetition procedure activation signal to activate the paging PDCCH repetition procedure.

At block 1106, the method 1100 may include decoding, based on the paging occasion configuration, signals received on at least one of resources for the first paging PDCCH monitoring occasion or resources for the second paging PDCCH monitoring occasion.

For example, the UE 1004 may monitor, based on the paging occasion configuration 1006, the first paging PDCCH monitor occasion 512 and the second paging PDCCH monitoring occasion 522 within a same frequency region (i.e., extended bandwidth part 542). In another example, the UE 1004 may monitor, based on the paging occasion configuration 1006, the first paging PDCCH monitoring occasion 612 and the second paging PDCCH monitoring occasion 622 within the same monitoring slot 640. In another example, the UE 1004 may monitor, based on the paging occasion configuration 1006, the first paging PDCCH monitoring occasion 712 in the first monitoring slot 740 and the second paging PDCCH monitoring occasion 722 within the second monitoring slot 750. In yet still another example, the UE 1004 may monitor, based on the paging occasion configuration 1006, one or more repetition patterns 914(1)-(N) of paging PDDCH monitoring occasions. Further, the UE 1004 may receive one or more CORESETs during the paging PDCCH monitoring occasions (e.g., paging PDCCH monitoring occasions 512, 522, 612, 622, 712, 722, 916(1)-(N), and 918(1)-(N)). Further, the decoding component 412 may decode the CORESETs to obtain the PDCCHs 1012(1)-(N).

In some aspects, the initial paging PDCCH monitoring occasion (e.g., paging PDCCH monitoring occasions 512, 612, and 712) may have the same quasi-co-location (QCL) assumption as the repetitive paging PDCCH monitoring occasions (e.g., paging PDCCH monitoring occasions 522, 622, and 722). For example, the UE 1004 may monitor, based on the paging occasion configuration 1006, the first paging PDCCH monitoring occasion and the second paging PDCCH monitoring occasion in association with a same quasi co-location assumption with a SSB of the base station 1002.

In some aspects, the initial paging PDCCH monitoring occasion may be the same size as the repetitive paging PDCCH monitoring occasions. For example, the first paging PDCCH monitoring occasion (e.g., paging PDCCH monitoring occasions 512, 612, and 712) and the second paging PDCCH monitoring occasion (e.g., paging PDCCH monitoring occasions 522, 622, and 722) may be associated with a same number of CCEs or a same time duration of a CORESET.

In some aspects, the UE 1004 may combine the PDCCH 1012(1) received during a first paging PDCCH monitoring occasion and the PDCCH 1012(2) received during a second paging PDCCH monitoring occasion to form a combined PDCCH. Further, decoding the signals may include decoding the combined PDCCH.

Accordingly, the UE 104, the UE 404, the UE 1004, the TX processor 368, the RX processor 356, and/or the controller/processor 359 executing the paging occasion component 140 and the decoding component 412 may provide means for decoding, based on the paging occasion configuration, signals received on at least one of resources for the first paging PDCCH monitoring occasion or resources for the second paging PDCCH monitoring occasion.

Figure 12:
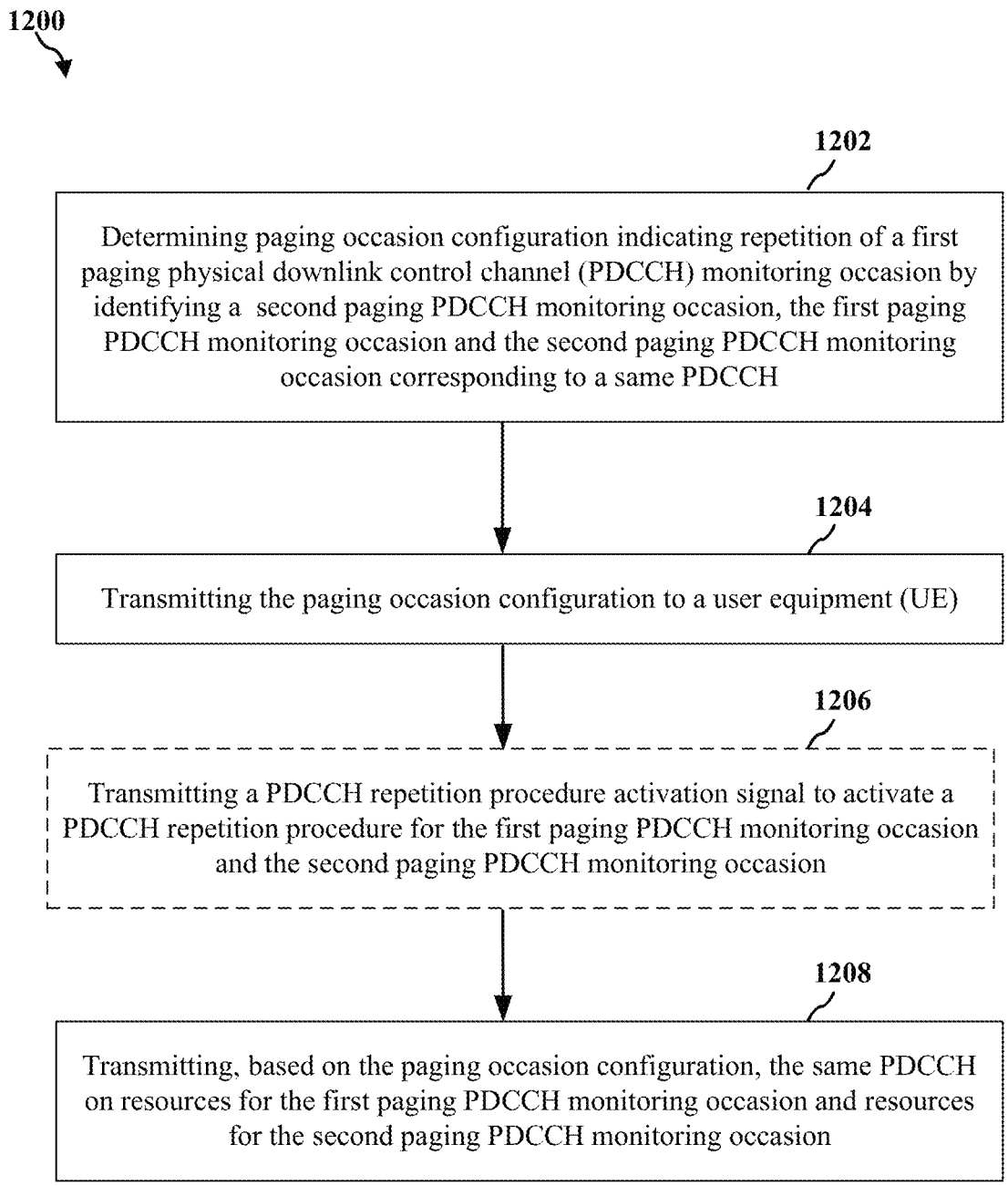
FIG. 12 is a flowchart illustrating an example method performed by a base station that supports a procedure for PDCCH monitoring for short message PDCCH repetition or paging PDCCH repetition in accordance with some aspects of the present disclosure.

FIG. 12 is a flowchart of a method 1200 of PDCCH monitoring for short message PDCCH repetition or paging PDCCH repetition. The method may be performed by a base station (e.g., the base station 102/180 of FIGS. 1 and 3, which may include the memory 376 and which may be the entire base station or a component of the base station, such as paging occasion management component 198, the TX processor 316, the RX processor 370, and/or the controller/processor 375; the base station 402 of FIG. 4; the base station 1002 of FIG. 10).

At block 1202, the method 1200 includes determining paging occasion configuration indicating repetition of a first paging PDCCH monitoring occasion by identifying a second paging PDCCH monitoring occasion, the first paging PDCCH monitoring occasion and the second paging PDCCH monitoring occasion corresponding to a same PDCCH. For example, the paging occasion management component 198 may generate the paging occasion configuration 1006. Further, the paging occasion configuration 1006 may indicate a type of repetition performed during a PDCCH repetition mode, a repetition pattern implemented during the PDCCH repetition mode, and/or a periodicity of repetitive paging PDCCH monitoring occasions during a PDCCH repetition mode. In addition, the paging occasion configuration 1006 may be provided to the UE 1004 semi-statically or dynamically. In some aspects, the paging occasion configuration 1006 may include a SIB identifying the first paging PDCCH monitoring occasion and the second paging PDCCH monitoring occasion. For example, the paging occasion configuration 1006 may identify a first repetition pattern including a first paging PDCCH monitoring occasion followed by a second paging PDCCH monitoring occasion, and a second repetition pattern of a plurality of PDCCH monitoring occasion. In some aspects, the first repetition pattern may be identified by a first parameter defining the number of paging PDCCH monitoring occasions within the first repetition pattern, and the second repetition pattern may be identified by a second parameter defining the number of paging PDCCH monitoring occasions within the second repetition pattern. Further, the first repetition pattern may be associated with a first SSB and the second repetition pattern associated with a second SSB. In some other aspects, the paging occasion configuration 1006 may include a short message identifying the first paging PDCCH monitoring occasion and the second paging PDCCH monitoring occasion.

Further, in some aspects, the paging occasion configuration 1006 may include a mapping type indicator identifying that the first paging PDCCH monitoring occasion and the second paging PDCCH monitoring occasion are associated with a same PDCCH mapped to a same plurality of control channel elements. Alternatively, in some aspects, the paging occasion configuration 1006 may include a mapping type indicator identifying that the first paging PDCCH monitoring occasion and the second paging PDCCH monitoring occasion are each associated with independently mapped PDCCH.

Accordingly, the base station 102, the base station 402, the base station 1002, the TX processor 316, the RX processor 370, and/or the controller/processor 375 executing the paging occasion management component 198 may provide means for determining paging occasion configuration indicating repetition of a first PDCCH monitoring occasion by identifying a second paging PDCCH monitoring occasion, the first paging PDCCH monitoring occasion and the second paging PDCCH monitoring occasion corresponding to a same PDCCH.

At block 1204, the method 1200 may include transmitting the paging occasion configuration to a UE. For example, the paging occasion management component 198 may transmit the paging occasion configuration 1006 to one or more UEs, e.g., the UE 404.

Accordingly, the base station 102, the base station 402, the base station 1002, the TX processor 316, the RX processor 370, and/or the controller/processor 375 executing the paging occasion management component 198 may provide means for transmitting the paging occasion configuration to UE.

At block 1206, the method 1200 may optionally include transmitting a PDCCH repetition procedure activation signal to activate the aggregated monitoring occasion of the grouping of PDCCH monitoring occasions.

For example, the paging occasion management component 198 may send the UE 404 the PDCCH repetition procedure activation signal 908 indicating the initiation of an enhanced-coverage PDCCH mode. In some aspects, the PDCCH repetition procedure activation signal 908 may be a radio resource control (RRC) configuration message including an activation indication, a media access control (MAC) control element (CE) including an activation signal, a UE specific downlink control information (DCI) including an activation signal, or a group-common downlink control information (DCI) including an activation signal.

Accordingly, the base station 102, the base station 402, the base station 1002, the TX processor 316, the RX processor 370, and/or the controller/processor 375 executing the paging occasion management component 198 may provide means for transmitting a PDCCH repetition procedure activation signal to activate the aggregated monitoring occasion of the grouping of DCCH monitoring occasions.

At block 1208, the method 1200 may include transmitting, based on the paging occasion configuration, the same PDCCH on resources for the first paging PDCCH monitoring occasion and resources for the second paging PDCCH monitoring occasion.

For example, the paging occasion management component 198 may transmit the CORESET including the PDCCHs 1012(1)-(N). In some aspects, the paging occasion management component 198 may transmit the short message or paging PDCCHs 1012(1)-(2) within a same frequency region for a first paging PDCCH monitoring occasion and a second paging PDCCH monitoring occasion. In some aspects, the paging occasion management component 198 may transmit the short message or paging PDCCHs 1012(1)-(2) within a same monitoring slot for a first paging PDCCH monitoring occasion and a second paging PDCCH monitoring occasion. In some other aspects, the paging occasion management component 198 may transmit the short message or paging PDCCH 1012(1) for a first paging PDCCH monitoring occasion in a first monitoring slot of a time division multiplex pattern, and transmit the short message or paging PDCCH 1012(2) for a second paging PDCCH monitoring occasion within a second monitoring slot of the time division multiplex pattern. In yet still another aspect, may the transmit the short message and paging PDCCHs 1012(1)-(6) during a first plurality of paging of monitoring occasions (i.e., a first repetition pattern), and transmit the short message and paging PDCCHs 1012(7)-(12) during a second plurality of paging of monitoring occasions (i.e., a second repetition pattern).

Additionally, in some aspects, the paging occasion management component 198 may transmit the PDCCHs 1012(1)-(2) for the first paging PDCCH monitoring occasion and the second paging PDCCH monitoring occasion in association using a same quasi co-location assumption with a SSB of the base station 1002. In addition, in some aspects, the base station 1002 may continuously map the PDCCH over the multiple monitoring occasions. Alternatively, the base station 1002 may repeat transmission of the PDCCH on multiple paging monitoring occasions.

Further, in some aspects, the paging occasion management component 198 may map the first paging PDCCH monitoring occasion and the second paging PDCCH monitoring occasion to the same plurality of CCEs. For example, the paging occasion management component 198 may map the PDCCH to the plurality of CCEs based on first mapping parameters to determine a first PDCCH 1012(1), map the same PDCCH to the plurality of CCEs based on second parameters to determine a second PDCCH 1012(1), and transmit the first PDCCH 1012(1) during a first PDDCH monitoring occasion and the second PDCCH 1012(2) during the second paging PDCCH monitoring occasion. Alternatively, the paging occasion management component 198 may map the first paging PDCCH monitoring occasion and the second paging PDCCH monitoring occasion to different pluralities of CCEs. For example, the paging occasion management component 198 may map a PDCCH to a first plurality of CC based on first mapping parameters to determine a first PDCCH 1012(1), map the same PDCCH to a second plurality of CCEs based on second parameters to determine a second PDCCH 1012(2), and transmit the first PDCCH 1012(1) during a first PDDCH monitoring occasion and the second PDCCH 1012(2) during the second paging PDCCH monitoring occasion.

Accordingly, the base station 102, the base station 402, the base station 1002, the TX processor 316, the RX processor 370, and/or the controller/processor 375 executing the paging occasion management component 198 may provide means for transmitting, based on the paging occasion configuration, the same PDCCH on resources for the first paging PDCCH monitoring occasion and resources for the second paging PDCCH monitoring occasion.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person having ordinary skill in the art to practice the various aspects described herein. Various modifications to these aspects will be readily apparent to a person having ordinary skill in the art, and the generic principles defined herein may be applied to other aspects. The claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to a person having ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Example Clauses

A. A method of wireless communication at a UE, comprising receiving paging occasion configuration indicating repetition of a first paging physical downlink control channel (PDCCH) monitoring occasion by identifying a second paging PDCCH monitoring occasion, and decoding, based on the paging occasion configuration, signals received on at least one of resources for the first paging PDCCH monitoring occasion or resources for the second paging PDCCH monitoring occasion.

B. The method as paragraph A recites, wherein receiving the paging occasion configuration comprises receiving a system information block (SIB) identifying the first paging PDCCH monitoring occasion and the second paging PDCCH monitoring occasion.

C. The method as paragraph A recites, wherein receiving the paging occasion configuration comprises receiving a short message identifying the first paging PDCCH monitoring occasion and the second paging PDCCH monitoring occasion.

D. The method as any of paragraphs A-C recite, further comprising combining a first PDCCH associated with the first paging PDCCH monitoring occasion and a second PDCCH associated with the second paging PDCCH monitoring occasion to form a combined PDCCH, and wherein decoding the signals comprises decoding the combined PDCCH.

E. The method as any of paragraphs A-D recite, wherein the first paging PDCCH monitoring occasion and the second paging PDCCH monitoring occasion correspond to one or more PDCCHs configured to schedule a Physical Downlink Shared Channel (PDSCH).

F. The method as any of paragraphs A-D recite, wherein the first paging PDCCH monitoring occasion corresponds to a first PDCCH configured to schedule a first Physical Downlink Shared Channel (PDSCH) and the second paging PDCCH monitoring occasion corresponds to a second PDCCH configured to schedule a second PDSCH.

G. The method as any of paragraphs A-D recite, wherein the first paging PDCCH monitoring occasion and the second paging PDCCH monitoring occasion correspond to one or more PDCCH candidates comprising a short message.

H. The method as any of paragraphs A-G recite, further comprising monitoring, based on the paging occasion configuration, the first paging PDCCH monitoring occasion and the second paging PDCCH monitoring occasion within a same frequency region.

I. The method as any of paragraphs A-G recite, further comprising monitoring, based on the paging occasion configuration, the first paging PDCCH monitoring occasion and the second paging PDCCH monitoring occasion within a monitoring slot of a time division multiplex pattern.

J. The method as any of paragraphs A-G recite, further comprising monitoring, based on the paging occasion configuration, the first paging PDCCH monitoring occasion in a first monitoring slot of a time division multiplex pattern and the second paging PDCCH monitoring occasion within a second monitoring slot of the time division multiplex pattern.

K. The method as any of paragraphs A-G recite, further comprising monitoring, based on the paging occasion configuration, the first paging PDCCH monitoring occasion and the second paging PDCCH monitoring occasion in association with a same quasi co-location assumption with a synchronization signal and physical broadcast channel block (SSB) of a base station.

L. The method as any of paragraphs A-K recite, wherein the first paging PDCCH monitoring occasion and the second paging PDCCH monitoring occasion are associated with a same number of control channel elements or a same time duration of a control resource set.

M. The method as any of paragraphs A-L recite, wherein receiving the paging occasion configuration comprises receiving a system information block (SIB) identifying a first repetition pattern including the first paging PDCCH monitoring occasion followed by the second paging PDCCH monitoring occasion, and a second repetition pattern of a plurality of PDCCH monitoring occasion, the first repetition pattern associated with a first synchronization signal and physical broadcast channel block (SSB) and the second repetition pattern associated with a second SSB.

N. The method as paragraph M recites, wherein the receiving paging occasion configuration comprises receiving a mapping type indicator identifying that the first paging PDCCH monitoring occasion and the second paging PDCCH monitoring occasion are associated with a same PDCCH candidate mapped to a same plurality of control channel elements.

O. The method as paragraph M recites, further comprising receiving the paging occasion configuration comprises a mapping type indicator identifying that the first paging PDCCH monitoring occasion and the second paging PDCCH monitoring occasion are each associated with independently mapped PDCCH candidates.

P. The method as any of paragraphs A-O recite, wherein receiving the paging occasion configuration comprises receiving a system information block (SIB) identifying a first number of paging PDCCH monitoring occasions of a first repetition pattern including the first paging PDCCH monitoring occasion followed by the second paging PDCCH monitoring occasion, and a second number of paging PDCCH monitoring occasions of a second repetition pattern including a plurality of PDCCH monitoring occasions, the first repetition pattern associated with a first synchronization signal and physical broadcast channel block (SSB) and the second repetition pattern associated with a second SSB.

Q. The method as any of paragraphs A-P recite, further comprising receiving an PDCCH repetition procedure activation signal to activate a paging PDCCH repetition procedure for the first paging PDCCH monitoring occasion and the second paging PDCCH monitoring occasion.

R. A UE for wireless communication, comprising a memory storing computer-executable instructions; and at least one processor coupled with the memory and configured to execute the computer-executable instructions to perform the method of any of paragraphs A-Q.

S. A UE for wireless communication, comprising means for performing the method of any of paragraphs A-Q.

T. A non-transitory computer-readable medium storing computer executable code, the code when executed by a processor causes the processor to perform the method of any of paragraphs A-Q.

U. A method of wireless communication at a base station, comprising determining paging occasion configuration indicating repetition of a first paging physical downlink control channel (PDCCH) monitoring occasion by identifying a second paging PDCCH monitoring occasion, the first paging PDCCH monitoring occasion and the second paging PDCCH monitoring occasion corresponding to a same PDCCH, transmitting the paging occasion configuration to a user equipment (UE), and transmitting, based on the paging occasion configuration, the same PDCCH on resources for the first paging PDCCH monitoring occasion and resources for the second paging PDCCH monitoring occasion.

V. The method as paragraph U recites, wherein transmitting the paging occasion configuration comprises sending a system information block (SIB) identifying the first paging PDCCH monitoring occasion and the second paging PDCCH monitoring occasion.

W. The method as paragraph U recites, wherein transmitting the paging occasion configuration comprises transmitting a short message identifying the first paging PDCCH monitoring occasion and the second paging PDCCH monitoring occasion.

X. The method as any of paragraphs U-W recite, wherein the same PDCCH comprises a short message PDCCH.

Y. The method as any of paragraphs U-W recite, wherein the same PDCCH comprises a paging PDCCH.

Z. The method as any of paragraphs U-Y recite, wherein transmitting the same PDCCH comprises transmitting, for the first paging PDCCH monitoring occasion and the second paging PDCCH monitoring occasion, the same PDCCH within a same frequency region of a frequency division multiplex pattern.

AA. The method as any of paragraphs U-Y recite, wherein transmitting the same PDCCH comprises transmitting, for the first paging PDCCH monitoring occasion and the second paging PDCCH monitoring occasion, the same PDCCH within a monitoring slot of a time division multiplex pattern.

AB. The method as any of paragraphs U-Y recite, wherein transmitting the same PDCCH comprises transmitting the same PDCCH for the first paging PDCCH monitoring occasion in a first monitoring slot of a time division multiplex pattern, and transmitting the same PDCCH for the second paging PDCCH monitoring occasion within a second monitoring slot of the time division multiplex pattern.

AC. The method as any of paragraphs U-Y recite, wherein the first paging PDCCH monitoring occasion and the second paging PDCCH monitoring occasion are associated with a same number of control channel elements or a same time duration of a control resource set.

AD. The method as any of paragraphs U-AC recite, wherein transmitting the paging occasion configuration comprises transmitting a system information block (SIB) identifying a first repetition pattern including the first paging PDCCH monitoring occasion followed by the second paging PDCCH monitoring occasion and a second repetition pattern of a plurality of paging PDCCH monitoring occasion, the first repetition pattern associated with a first synchronization signal and physical broadcast channel block (SSB) and the second repetition pattern associated with a second SSB.

AE. The method as paragraph AD recites, further comprising monitoring, based on the paging occasion configuration, the first paging PDCCH monitoring occasion and the second paging PDCCH monitoring occasion in association with a same quasi co-location assumption with a synchronization signal and physical broadcast channel block (SSB) of a base station.

AF. The method as paragraph AD recites, wherein transmitting the paging occasion configuration comprises transmitting a mapping type indicator identifying that the first paging PDCCH monitoring occasion and the second paging PDCCH monitoring occasion are mapped to a plurality of control channel elements, and further comprising mapping the same PDCCH to the plurality of control channel elements based on first mapping parameters to determine a first PDCCH candidate, mapping the same PDCCH candidate to the plurality of control channel elements based on second parameters to determine a second PDCCH candidate, and transmitting the first PDCCH candidate during a first PDDCH monitoring occasion and the second PDCCH candidate during the second paging PDCCH monitoring occasion.

AG. The method as paragraph AD recites, wherein transmitting the paging occasion configuration comprises transmitting a mapping type indicator identifying that the first PDCCH monitoring is associated and the second paging PDCCH monitoring occasion are each associated with independently mapped PDCCH candidates, and further comprising: mapping the same PDCCH to a first plurality of control channel elements based on first mapping parameters to determine a first PDCCH candidate, mapping the same PDCCH candidate to a second plurality of control channel elements based on second parameters to determine a second PDCCH candidate, and transmitting the first PDCCH candidate during a first PDDCH monitoring occasion and the second PDCCH candidate during the second paging PDCCH monitoring occasion.

AH. The method as paragraph U recites, wherein transmitting the paging occasion configuration comprises transmitting a system information block (SIB) identifying a first number of paging PDCCH monitoring occasions of a first repetition pattern including the first paging PDCCH monitoring occasion followed by the second paging PDCCH monitoring occasion, and a second number of paging PDCCH monitoring occasions of a second repetition pattern including a plurality of PDCCH monitoring occasions, the first repetition pattern associated with a first synchronization signal and physical broadcast channel block (SSB) and the second repetition pattern associated with a second SSB.

AI. The method as any of paragraphs U-AH recite, further comprising transmitting a PDCCH repetition procedure activation signal to activate a paging PDCCH repetition procedure for the first paging PDCCH monitoring occasion and the second paging PDCCH monitoring occasion.

AJ. A base station for wireless communication, comprising a memory storing computer-executable instructions; and at least one processor coupled with the memory and configured to execute the computer-executable instructions to perform the method of any of paragraphs S-AE.

AK. A base station for wireless communication, comprising means for performing the method of any of paragraphs S-AE.

AL. A non-transitory computer-readable medium storing computer executable code, the code when executed by a processor causes the processor to perform the method of any of paragraphs U-AK.

What is claimed is:

1. A user equipment (UE) for wireless communication, comprising:
    a memory; and
    at least one processor coupled with the memory, wherein the UE is configured to:
        receive paging occasion configuration indicating a repetition of a physical downlink control channel (PDCCH) transmission during a first paging PDCCH monitoring occasion and during a second paging PDCCH monitoring occasion;
        monitor, based on the paging occasion configuration, the first paging PDCCH monitoring occasion and the second paging PDCCH monitoring occasion in association with a same quasi co-location assumption; and
        decode, based on the paging occasion configuration, the repetition of the PDCCH transmission received on at least one of resources for the first paging PDCCH monitoring occasion or resources for the second paging PDCCH monitoring occasion.

2. The UE of claim 1, wherein to receive the paging occasion configuration, the UE is configured to:
    receive a system information block (SIB) identifying the first paging PDCCH monitoring occasion and the second paging PDCCH monitoring occasion.

3. The UE of claim 1, wherein to receive the paging occasion configuration, the UE is configured to:
    receive a short message identifying the first paging PDCCH monitoring occasion and the second paging PDCCH monitoring occasion.

4. The UE of claim 1, wherein the UE is configured to:
    combine a first PDCCH transmission associated with the first paging PDCCH monitoring occasion and a second PDCCH transmission associated with the second paging PDCCH monitoring occasion to form a combined PDCCH transmission, and
    wherein to decode the repetition of the PDCCH transmission, the UE is configured to decode the combined PDCCH transmission.

5. The UE of claim 1, wherein the first paging PDCCH monitoring occasion and the second paging PDCCH monitoring occasion correspond to one or more PDCCH transmissions configured to schedule a Physical Downlink Shared Channel (PDSCH).

6. The UE of claim 1, wherein the first paging PDCCH monitoring occasion corresponds to a first PDCCH transmission configured to schedule a first Physical Downlink Shared Channel (PDSCH) and the second paging PDCCH monitoring occasion corresponds to a second PDCCH transmission configured to schedule a second PDSCH.

7. The UE of claim 1, wherein the first paging PDCCH monitoring occasion and the second paging PDCCH monitoring occasion correspond to one or more PDCCH candidates comprising a short message.

8. The UE of claim 1, wherein the UE is configured to:
    monitor, based on the paging occasion configuration, the first paging PDCCH monitoring occasion and the second paging PDCCH monitoring occasion within a same frequency region.

9. The UE of claim 1, wherein the UE is configured to:
    monitor, based on the paging occasion configuration, the first paging PDCCH monitoring occasion and the second paging PDCCH monitoring occasion within a monitoring slot of a time division multiplex pattern.

10. The UE of claim 1, wherein the UE is configured to:
    monitor, based on the paging occasion configuration, the first paging PDCCH monitoring occasion in a first monitoring slot of a time division multiplex pattern and the second paging PDCCH monitoring occasion within a second monitoring slot of the time division multiplex pattern.

11. The UE of claim 1, wherein the same quasi co-location assumption is associated with a synchronization signal and physical broadcast channel block (SSB) of a base station.

12. The UE of claim 1, wherein the first paging PDCCH monitoring occasion and the second paging PDCCH monitoring occasion are associated with a same number of control channel elements or a same time duration of a control resource set.

13. The UE of claim 1, wherein to receive the paging occasion configuration, the UE is configured to:
    receive a system information block (SIB) identifying a first repetition pattern including the first paging PDCCH monitoring occasion followed by the second paging PDCCH monitoring occasion, and a second repetition pattern of a plurality of paging PDCCH monitoring occasions, the first repetition pattern associated with a first synchronization signal and physical broadcast channel block (SSB) and the second repetition pattern associated with a second SSB.

14. The UE of claim 1, wherein to receive the paging occasion configuration, the UE is configured to:
    receive a system information block (SIB) identifying a first number of paging PDCCH monitoring occasions of a first repetition pattern including the first paging PDCCH monitoring occasion followed by the second paging PDCCH monitoring occasion, and a second number of paging PDCCH monitoring occasions of a second repetition pattern including a plurality of paging PDCCH monitoring occasions, the first repetition pattern associated with a first synchronization signal and physical broadcast channel block (SSB) and the second repetition pattern associated with a second SSB.

15. The UE of claim 1, wherein the UE is configured to:
    receive a PDCCH repetition procedure activation signal to activate a paging PDCCH repetition procedure for the first paging PDCCH monitoring occasion and the second paging PDCCH monitoring occasion.

16. A method of wireless communication performed by a user equipment (UE), comprising:
receiving paging occasion configuration indicating a repetition of a physical downlink control channel (PDCCH) transmission during a first paging PDCCH monitoring occasion and during a second paging PDCCH monitoring occasion;
monitoring, based on the paging occasion configuration, the first paging PDCCH monitoring occasion and the second paging PDCCH monitoring occasion in association with a same quasi co-location assumption with a synchronization signal and physical broadcast channel block (SSB) of a base station; and
decoding, based on the paging occasion configuration, the repetition of the PDCCH transmission received on at least one of resources for the first paging PDCCH monitoring occasion or resources for the second paging PDCCH monitoring occasion.

17. A base station for wireless communication, comprising:
a memory; and
at least one processor coupled with the memory, wherein the base station is configured to:
determine paging occasion configuration indicating a repetition of a physical downlink control channel (PDCCH) transmission during a first paging physical downlink control channel (PDCCH) PDCCH monitoring occasion by identifying and during a second paging PDCCH monitoring occasion;
transmit the paging occasion configuration to a user equipment (UE); and
transmit, based on the paging occasion configuration, the repetition of the PDCCH transmission on resources for the first paging PDCCH monitoring occasion and resources for the second paging PDCCH monitoring occasion using a same quasi co-location assumption.

18. The base station of claim 17, wherein to transmit the paging occasion configuration, the base station is configured to:
send a system information block (SIB) identifying the first paging PDCCH monitoring occasion and the second paging PDCCH monitoring occasion.

19. The base station of claim 17, wherein to transmit the paging occasion configuration, the base station is configured to:
transmit a short message identifying the first paging PDCCH monitoring occasion and the second paging PDCCH monitoring occasion.

20. The base station of claim 17, wherein the repetition of the PDCCH transmission comprises a short message PDCCH transmission.

21. The base station of claim 17, wherein the repetition of the PDCCH transmission comprises a paging PDCCH transmission.

22. The base station of claim 17, wherein to transmit the same repetition of the PDCCH transmission, the base station is configured to:
transmit, for the first paging PDCCH monitoring occasion and the second paging PDCCH monitoring occasion, the repetition of the PDCCH transmission within a same frequency region of a frequency division multiplex pattern.

23. The base station of claim 17, wherein to transmit the repetition of the PDCCH transmission, the base station is configured to:
transmit, for the first paging PDCCH monitoring occasion and the second paging PDCCH monitoring occasion, the repetition of the PDCCH transmission within a monitoring slot of a time division multiplex pattern.

24. The base station of claim 17, wherein to transmit the repetition of the PDCCH transmission, the base station is configured to:
transmit the repetition of the PDCCH transmission for the first paging PDCCH monitoring occasion in a first monitoring slot of a time division multiplex pattern; and
transmit the repetition of the PDCCH transmission for the second paging PDCCH monitoring occasion within a second monitoring slot of the time division multiplex pattern.

25. The base station of claim 17, wherein the same quasi co-location assumption is associated with a synchronization signal block.

26. The base station of claim 17, wherein the first paging PDCCH monitoring occasion and the second paging PDCCH monitoring occasion are associated with a same number of control channel elements or a same time duration of a control resource set.

27. The base station of claim 17, wherein to transmit the paging occasion configuration, the base station is configured to:
transmit a system information block (SIB) identifying a first repetition pattern including the first paging PDCCH monitoring occasion followed by the second paging PDCCH monitoring occasion and a second repetition pattern of a plurality of paging PDCCH monitoring occasions, the first repetition pattern associated with a first synchronization signal and physical broadcast channel block (SSB) and the second repetition pattern associated with a second SSB.

28. The base station of claim 17, wherein to transmit the paging occasion configuration, the base station is configured to:
transmit a system information block (SIB) identifying a first number of paging PDCCH monitoring occasions of a first repetition pattern including the first paging PDCCH monitoring occasion followed by the second paging PDCCH monitoring occasion, and a second number of paging PDCCH monitoring occasions of a second repetition pattern including a plurality of paging PDCCH monitoring occasions, the first repetition pattern associated with a first synchronization signal and physical broadcast channel block (SSB) and the second repetition pattern associated with a second SSB.

29. The base station of claim 17, wherein base station is configured to:
transmit a PDCCH repetition procedure activation signal to activate a paging PDCCH repetition procedure for the first paging PDCCH monitoring occasion and the second paging PDCCH monitoring occasion.

30. A method of wireless communication performed by a base station, comprising:
determining paging occasion configuration indicating a repetition of a physical downlink control channel (PDCCH) transmission during a first paging PDCCH monitoring occasion and during a second paging PDCCH monitoring occasion;
transmitting the paging occasion configuration to a user equipment (UE); and
transmitting, based on the paging occasion configuration, the repetition of the PDCCH transmission on resources for the first paging PDCCH monitoring occasion and resources for the second paging PDCCH monitoring occasion using a same quasi co-location assumption.

\* \* \* \* \*